(12) United States Patent
Shimamoto et al.

(10) Patent No.: US 8,335,141 B2
(45) Date of Patent: Dec. 18, 2012

(54) OPTICAL DISC DISCRIMINATION METHOD, OPTICAL DISC DEVICE AND INTEGRATED CIRCUIT

(75) Inventors: Takeshi Shimamoto, Osaka (JP); Takashi Kishimoto, Nara (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/319,435

(22) PCT Filed: Mar. 3, 2011

(86) PCT No.: PCT/JP2011/001268
§ 371 (c)(1),
(2), (4) Date: Nov. 8, 2011

(87) PCT Pub. No.: WO2011/111346
PCT Pub. Date: Sep. 15, 2011

(65) Prior Publication Data
US 2012/0051202 A1    Mar. 1, 2012

(30) Foreign Application Priority Data
Mar. 9, 2010    (JP) .................................. 2010-051376

(51) Int. Cl.
*G11B 15/04*    (2006.01)
(52) U.S. Cl. .................... 369/53.22; 369/30.04
(58) Field of Classification Search .................. None
See application file for complete search history.

(56) References Cited

U.S. PATENT DOCUMENTS
2002/0145966 A1* 10/2002 Hirotsune et al. ......... 369/275.3

FOREIGN PATENT DOCUMENTS
| JP | 2000-187928 | 7/2000 |
| JP | 2005-158180 | 6/2005 |
| JP | 2006-228364 | 8/2006 |
| JP | 2008-108400 | 5/2008 |

OTHER PUBLICATIONS
International Search Report issued May 31, 2011 in International (PCT) Application No. PCT/JP2011/001268.

* cited by examiner

*Primary Examiner* — Paul Huber
(74) *Attorney, Agent, or Firm* — Wenderoth, Lind & Ponack, L.L.P.

(57) ABSTRACT

Provided are an optical disc discrimination method, an optical disc device and an integrated circuit that enable to accurately discriminate the type of an optical disc. The optical disc discrimination method comprises a first seeking step (S3) of performing a seek operation to a predetermined reference address in a user data area; a second seeking step (S5) of performing a seek operation from the reference address sought in the first seeking step (S3) to a predetermined target address in a physical information area, an address reading step (S7) of reading a current address at a position sought in the second seeking step (S5), and an optical disc type determination step (S8 through S10) of determining the type of the optical disc loaded in the optical disc device, based on the current address read in the address reading step (S7).

10 Claims, 8 Drawing Sheets

OPTICAL DISC DISCRIMINATION METHOD, OPTICAL DISC DEVICE AND INTEGRATED CIRCUIT

This application is a 371 of PCT/JP2011/001268, filed Mar. 3, 2011.

TECHNICAL FIELD

The present invention relates to an optical disc discrimination method, an optical disc device and an integrated circuit for discriminating, from a plurality of types of optical discs having recording densities different from each other, the type of an optical disc loaded in the optical disc device for reading information recorded on the optical disc or recording information on the optical disc by irradiating a light beam onto the optical disc.

BACKGROUND ART

As an approach for increasing the recording capacity of an optical disc, there are known the techniques of increasing the recording density of an optical disc and of increasing the number of recording layers. In the process of increasing the recording capacity e.g. from CD to DVD or from DVD to Blu-ray Disc, a high-density optical disc is realized by modifying the structure of an optical disc by e.g. forming a recording layer of an optical disc at a position closer to a surface of the optical disc, in addition to modifying the arrangement of an optical pickup by e.g. increasing the numerical aperture of an objective lens and using a short wavelength as the laser wavelength.

In recent years, high-density information recording or reproducing has been possible while keeping the arrangement of an optical system in an optical pickup and the configuration of an optical disc unchanged, owing to the development of the reproduction signal processing technology. There has been proposed an optical disc having a recording density higher than the recording density of Blu-ray Disc capable of recording or reproducing information, using an optical system compatible with Blu-ray Disc. If the recording density differs, the correspondence between the address on an optical disc, and the actual radial position on the optical disc changes. In view of the above, in the case where an optical disc having a recording density different from the recording density of a previously loaded optical disc is loaded in the optical disc device, it is necessary to discriminate the recording densities of the optical discs from each other.

As a conventional example of optical discs having recording densities different from each other and capable of recording or reproducing information by a common optical system, there are known a single-layer DVD and a dual-layer DVD. The recording capacity of the single-layer DVD is 4.7 GBytes, and the recording capacity of the dual-layer DVD is 8.5 GBytes. The recording density of the dual-layer DVD per layer differs from that of the single-layer DVD by about 10%.

In the above example, the recording layer number and the recording density have one-to-one correspondence, and it is possible to easily discriminate the recording densities from each other by counting the number of recording layers. Thus, it is possible to discriminate the recording densities from each other before information is recorded or reproduced.

In the case of Blu-ray Disc, a physical information area recorded with physical information unique to the optical disc is formed in an inner periphery of the optical disc. The physical information area is formed by a track pitch and an address format different from those for a user data area. It is possible to obtain the recording layer number and the recording density of the optical disc loaded in the optical disc device by reproducing the physical information recorded in the physical information area.

Further, patent literature 1 proposes a method for discriminating the recording density of an optical disc before the physical information is reproduced by moving an optical pickup to a specific radial position and by rotating a spindle motor at a specific rotation speed for measuring the frequency of a wobbling groove formed in the optical disc.

On the other hand, there may be a case that it is impossible to accurately count the recording layer number in advance, or it is impossible to accurately discriminate the recording density.

As a method for counting the recording layer number, the counting can be realized by counting the number of focus error signals (hereinafter, called as FE signals) obtained when an objective lens is moved toward a recording layer of an optical disc in a state that laser light is emitted.

However, there is a case that it is difficult to accurately count the recording layer number, e.g. in the case where the recording layer number is increased to three layers or four layers.

In an optical system configured such that the numerical aperture of an objective lens is increased and a short wavelength is used as the laser wavelength so that the optical system is compatible with Blu-ray Disc, it is necessary to properly correct the spherical aberration which changes depending on the thickness of a cover layer of an optical disc. If the spherical aberration of a specific recording layer of plural recording layers is corrected to optimize the spherical aberration, the other recording layers may have an intolerably large spherical aberration, which may result in serious deterioration of the amplitude of an FE signal obtained from the other recording layers.

FIG. 6 is a diagram showing an example of an arrangement on a surface and recording layers of each of a single-layer optical disc, a dual-layer optical disc, a triple-layer optical disc and a quadruple-layer optical disc with respect to the thickness direction thereof. In the dual-layer optical disc, the triple-layer optical disc and the quadruple-layer optical disc, the second to fourth recording layers are formed in this order with respect to the position where the first recording layer as a recording layer farthest from the surface is formed.

The single-layer optical disc has a first recording layer. The dual-layer optical disc has a first recording layer farthest from a surface (light incident surface), and a second recording layer closest to the surface. The triple-layer optical disc has a first recording layer farthest from a surface, a second recording layer second farthest from the surface and a third recording layer closest to the surface. The quadruple-layer optical disc has a first recording layer farthest from a surface, a second recording layer second farthest from the surface, a third recording layer third farthest from the surface and a fourth recording layer closest to the surface.

Taking into account the compatibility with an existing optical disc, the layer structure of a multi-layer optical disc is such that the second to fourth recording layers of each of the dual-layer optical disc, the triple-layer optical disc and the quadruple-layer optical disc are disposed relative to the first recording layer corresponding to the first recording layer of the single-layer optical disc. Specifically, the distance from the surface of each of the dual-layer optical disc, the triple-layer optical disc and the quadruple-layer optical disc to the first recording layer of the each respective optical disc is the same as the distance from the surface of the single-layer optical disc to the first recording layer thereof.

FIG. 7 and FIG. 8 are diagrams showing FE signals detected in the case where the spherical aberration of each respective optical disc is corrected to optimize the spherical aberration of the recording layer farthest from the surface of the each respective optical disc, and the objective lens is moved toward the each respective optical disc in a state that laser light is emitted. FIG. 7 is a diagram showing FE signals detected from a triple-layer optical disc, and FIG. 8 is a diagram showing FE signals detected from a quadruple-layer optical disc.

Generally, if the reflectance difference between recording layers is reduced, while increasing the recording layer number, the reflectance is lowered as the recording layer number is increased. Taking into account the aforementioned influence by spherical aberration, there exists a recording layer whose FE signal amplitude is smaller than that on the surface of the optical disc.

Referring to FIG. 7, FE signals 201, 202, 203, 204 are respectively FE signals obtained from the surface, the first recording layer, the second recording layer and the third recording layer. The presence or absence of a recording layer is determined by judging whether the level of the FE signal has exceeded a plus detection threshold value 205 and a minus detection threshold value 206. In this case, there are four FE signals which have exceeded the detection threshold values, including an FE signal corresponding to the surface, and it is determined that the optical disc has three recording layers.

In FIG. 8, FE signals 301, 302, 303, 304, 305 are respectively FE signals obtained from the surface, the first recording layer, the second recording layer, the third recording layer and the fourth recording layer. The presence or absence of a recording layer is determined by judging whether the level of the FE signal has exceeded the plus detection threshold value 205 and the minus detection threshold value 206. In this case, the FE signal 305 obtained from the fourth recording layer does not exceed the plus detection threshold value 205 and the minus detection threshold value 206. Accordingly, there are four FE signals that have exceeded the detection threshold values, including an FE signal corresponding to the surface, and it is erroneously determined that the optical disc has three recording layers.

As described above, as the recording layer number is increased, the layer interval between the recording layer closest to the surface of the optical disc and the recording layer farthest from the surface of the optical disc is increased. As a result, deterioration in the FE signal amplitude resulting from spherical aberration is increased, and it is impossible to precisely discriminate the recording layer number by FE signals.

It may be possible to enhance the detection precision on the recording layer number by repeating an operation of measuring an FE signal by driving the objective lens while correcting an estimated spherical aberration for each respective recording layer. In this case, however, the larger the recording layer number is, the longer the time required for the measuring operation is.

Further, it is possible to discriminate the recording densities from each other by the aforementioned method of measuring the frequency of a wobbling groove, in the case where the recording density difference is sufficiently large. However, taking into account the precision in moving the optical pickup in the radial direction of an optical disc, an error in the rotation speed of the spindle motor, and an influence by rotational variation of the spindle motor, it is difficult to precisely discriminate the recording densities from each other, in the case where the recording density difference is small.

Next, there is described a problem to be solved in an optical disc compatible with an optical system for Blu-ray Disc in increasing the recording density of the optical disc.

Even in the case where the recording densities differ from each other, it is desirable to dispose various areas on an optical disc in accordance with the recording density of an existing optical disc. In particular, it is desirable to dispose areas having different physical properties from each other at a substantially same radial position.

Specifically, the physical information area on Blu-ray Disc is formed by a track pitch and an address format different from those for the user data area. Accordingly, it is impossible to read the address of the physical information area even if a seek operation is performed in the same manner as for the user data area. As a result, in the case where the physical information area on an optical disc having a recording density different from the recording density of an existing optical disc is formed at a different radial position, and laser light is inadvertently irradiated onto the physical information area of the optical disc, the address of the physical information area may not be read, which makes it impossible to perform an operation thereafter.

If the recording densities of two optical discs differ from each other, the addresses at each respective radial position on the two optical discs inevitably differ from each other. This means that the addresses of the physical information areas on optical discs having recording densities different from each other differ from each other with respect to the innermost periphery of the user data area, despite that the physical information of these two optical discs exists at the same radial position.

The address information representing the address of information to be read out is necessary to read out the information from the optical disc. However, it is impossible to accurately obtain the address of the physical information area in a condition that the recording density cannot be accurately discriminated.

For instance, let it be assumed that the address of a physical information area is set and a seek operation is performed, based on the premise that the recording density of an optical disc loaded in an optical disc device has a recording density different from the actual recording density of the optical disc. In this case, since there is no physical information in the area sought by the seek operation, it is impossible to obtain the physical information unique to the loaded optical disc, which makes it impossible to perform an operation thereafter.

CITATION LIST

Patent Literature

Patent Literature 1: JP 2008-108400A

SUMMARY OF INVENTION

An object of the invention is to provide an optical disc discrimination method, an optical disc device and an integrated circuit that enable to securely discriminate the type of an optical disc.

An optical disc discrimination method according to an aspect of the invention is an optical disc discrimination method for discriminating, from a plurality of types of optical discs having recording densities different from each other, the type of an optical disc loaded in an optical disc device for reading information recorded on the optical disc or for recording information on the optical disc by irradiating a light beam onto the optical disc. The optical disc has a user data area and a physical information area having formats different from each other. The optical disc discrimination method comprises a first seeking step of performing a seek operation to a predetermined reference address in the user data area; a second seeking step of performing a seek operation from the reference address sought in the first seeking step to a predetermined target address in the physical information area; an address reading step of reading a current address at a position sought in the second seeking step; and an optical disc type determination step of determining the type of the optical disc loaded in the optical disc device, based on the current address read in the address reading step.

With the above arrangement, the optical disc has the user data area and the physical information area having the formats different from each other. In the first seeking step, the seek operation to the predetermined reference address in the user data area is performed; and in the second seeking step, the seek operation from the reference address sought in the first seeking step to the predetermined target address in the physical information area is performed. In the address reading step, the current address at the position sought in the second seeking step is read; and in the optical disc type determination step, the type of the optical disc loaded in the optical disc device is determined, based on the current address read in the address reading step.

According to the invention, it is possible to securely perform a seek operation to the physical information area, and to securely discriminate the type of the optical disc, even in a condition that the type of the optical disc loaded in the optical disc device is not accurately determined.

These and other objects, features and advantages of the present invention will become more apparent upon reading the following detailed description along with the accompanying drawings.

DESCRIPTION OF EMBODIMENTS

In the following, embodiments of the invention are described referring to the accompanying drawings. The following embodiments are merely examples embodying the invention, and do not limit the technical feature of the invention.

(First Embodiment)

Figure 1:
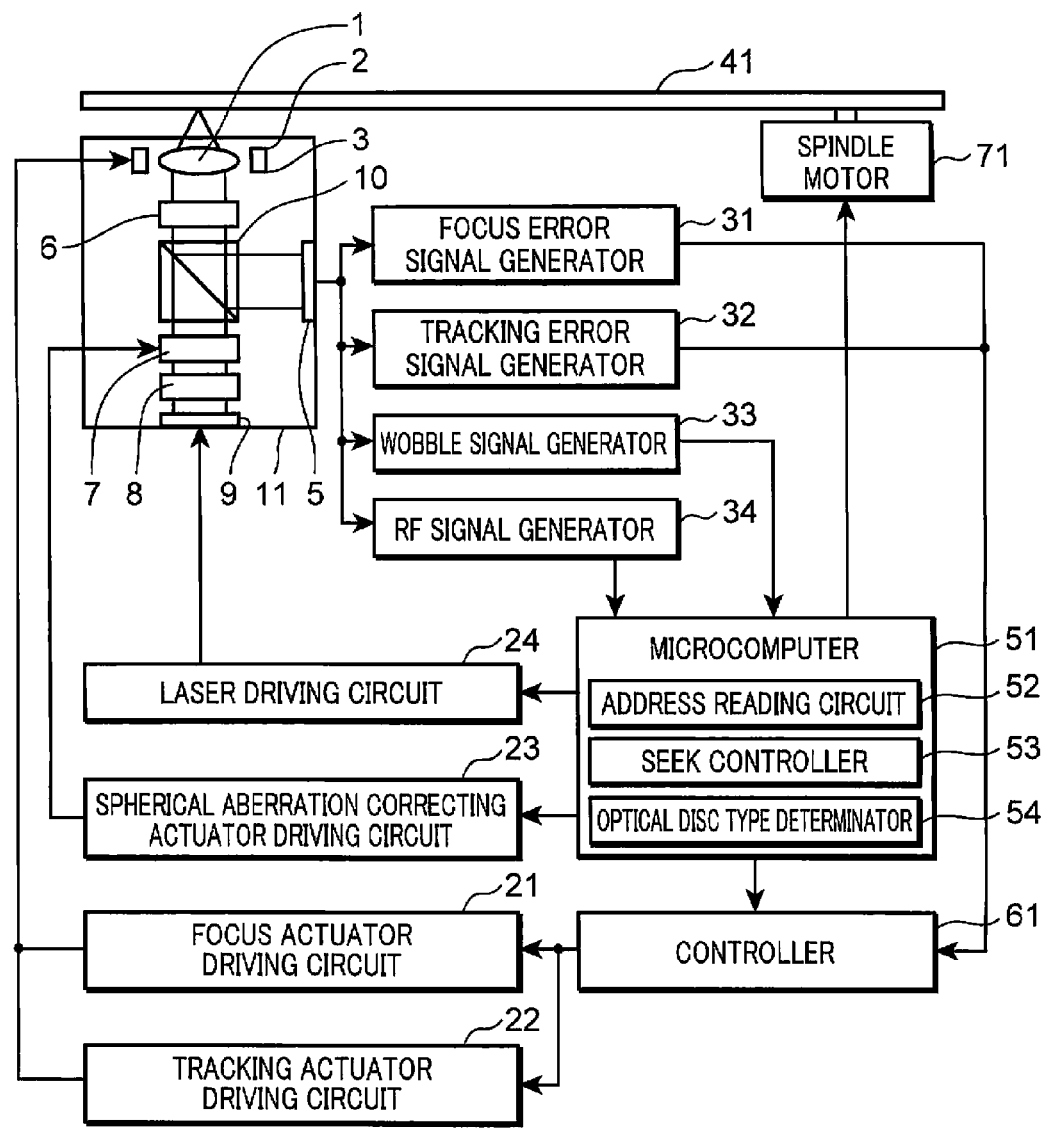
FIG. 1 is a block diagram showing an arrangement of an optical disc device in a first embodiment of the invention.

FIG. 1 is a block diagram showing an arrangement of an optical disc device in the first embodiment of the invention.

The optical disc device shown in FIG. 1 is provided with an optical pickup 11, a focus actuator driving circuit 21, a tracking actuator driving circuit 22, a spherical aberration correcting actuator driving circuit 23, a laser driving circuit 24, a focus error signal generator 31, a tracking error signal generator 32, a wobble signal generator 33, an RF signal generator 34, a microcomputer 51, a controller 61 and a spindle motor 71. The optical pickup 11 is provided with an objective lens 1, a focus actuator 2, a tracking actuator 3, a light receiver 5, a quarter wave plate 6, a spherical aberration correcting element 7, a collimator lens 8, a laser light source 9 and a polarized beam splitter 10.

The optical pickup 11 shown in FIG. 1 irradiates a light beam onto an optical disc 41 for reading information recorded on the optical disc 41 or recording information on the optical disc 41. The focus actuator driving circuit 21 displaces the objective lens 1 in the optical pickup 11 in a direction substantially perpendicular to the optical disc 41.

The optical disc device shown in FIG. 1 is adapted to record information on the optical disc 41 or reproduce information recorded on the optical disc 41.

The laser light source 9 outputs laser light. The microcomputer 51 outputs a drive command value to the laser driving circuit 24. The laser driving circuit 24 supplies a current corresponding to the drive command value to the laser light source 9. Upon receiving the current from the laser light driving circuit 24, the laser light source 9 emits laser light.

Firstly, a light beam emitted from the laser light source 9 provided in the optical pickup 11 is converted into a parallel light beam by the collimator lens 8. The parallel light beam is focused on an information recording layer (a recording film) of the optical disc 41 by the objective lens 1 via the spherical aberration correcting element 7, the polarized beam splitter 10 and the quarter wave plate 6.

Light reflected on the optical disc 41 passes through the objective lens 1 and through the quarter wave plate 6, is reflected on the polarized beam splitter 10, and impinges on the light receiver 5. The optical disc 41 is driven and rotated by the spindle motor 71. The microcomputer 51 outputs a drive command value to the spindle motor 71. The spindle motor 71 drives and rotates the optical disc 41 in accordance with the drive command value.

The light receiver 5 converts the light reflected on the optical disc 41 into an electric signal. An output from the light receiver 5 is supplied to the focus error signal generator 31, the tracking error signal generator 32, the wobble signal generator 33 and the RF signal generator 34.

The focus error signal generator 31 detects a positional displacement between the focus position of a light beam irradiated onto the optical disc 41, and an information surface (a recording layer) of the optical disc 41, based on the output from the light receiver 5; and outputs the detected positional displacement as a focus error signal (an FE signal). The FE signal may be generated by e.g. an astigmatism method.

The tracking error signal generator 32 detects a positional displacement between the spot of a light beam formed on the information surface of the optical disc 41, and a track on the information surface of the optical disc 41, based on the output from the light receiver 5; and outputs the detected positional displacement as a tracking error signal. The tracking error signal may be generated by e.g. a push-pull method.

The FE signal and the tracking error signal are supplied to the controller 61. The controller 61 applies signal processing such as phase compensation to the FE signal and to the tracking error signal, and generates a control signal.

The focus actuator driving circuit 21 and the tracking actuator driving circuit 22 respectively supply drive signals to the focus actuator 2 and to the tracking actuator 3 disposed in the optical pickup 11 in accordance with the control signal from the controller 61, whereby the focus actuator 2 and the tracking actuator 3 are driven.

The focus actuator 2 and the tracking actuator 3 drive the objective lens 1 in accordance with the drive signals from the focus actuator driving circuit 21 and from the tracking actuator driving circuit 22.

In this way, the controller 61 forms a servo loop for focus control by controlling the focus actuator driving circuit 21 which drives the focus actuator 2 in accordance with an FE signal. Further, the controller 61 forms a servo loop for tracking control by controlling the tracking actuator driving circuit 22 which drives the tracking actuator 3 in accordance with a tracking error signal. Servo control is executed as described above.

The spherical aberration correcting actuator driving circuit 23 corrects a spherical aberration included in a light beam by supplying a drive signal to the spherical aberration correcting element 7 in accordance with a control signal from the microcomputer 51. The spherical aberration correcting element 7 is constituted of e.g. a crystal liquid element, and corrects a spherical aberration included in a light beam by changing the refractive index in accordance with a drive signal from the spherical aberration correcting actuator driving circuit 23.

The wobble signal generator 33 generates a wobble signal based on the output from the light receiver 5, and outputs the generated wobble signal to the microcomputer 51.

The wobble signal is transmitted to an address reading circuit 52 provided in the microcomputer 51, and the address reading circuit 52 reads an address based on the wobble signal.

The RF signal generator 34 generates an RF signal based on the output from the light receiver 5, and outputs the generated RF signal to the microcomputer 51. The microcomputer 51 reads the information recorded on the optical disc 41 based on the RF signal.

The microcomputer 51 is provided with a seek controller 53 and an optical disc type determinator 54. The seek controller 53 causes the optical pickup 11 to perform a seek operation to a predetermined address on the optical disc. The seek operation represents an operation of moving the optical pickup 11 to a predetermined track. The address reading circuit 52 reads the current address at a position sought by the seek controller 53. The optical disc type determinator 54 determines the type of the optical disc, based on the current address read by the address reading circuit 52.

The focus error signal generator 31, the tracking error signal generator 32, the wobble signal generator 33, the RF signal generator 34, the controller 61 and the microcomputer 51 may preferably be constituted by one or more digital circuits. The focus error signal generator 31, the tracking error signal generator 32, the wobble signal generator 33, the RF signal generator 34, the controller 61 and the microcomputer 51 may be integrated on a single semiconductor integrated circuit board (a single semiconductor chip).

Next, an FE signal obtained when a light beam is incident into the optical disc 41 is described.

If the recording layer number is increased, and physical parameters of the respective recording layers as represented by a reflectance are exceedingly different from each other, it is difficult to discriminate the recording layers from each other by the optical disc device. In view of this, it is desirable to make the physical parameters of the respective recording layers substantially identical to each other. In case of a dual-layer disc such as DVD or Blu-ray Disc, the reflectance ratio between two recording layers is about two times at most. Further, generally, if the recording layer number is increased, the farther the target recording layer is from the surface of the optical disc, the larger the number of the other recording layers through which light passes until the light reaches the target recording layer. As a result, the reflectance of the target recording layer is lowered. If a multilayer optical disc is designed to meet both of the requirements, the reflectance of each respective recording layer is resultantly lowered as a whole.

The reflectance of each respective recording layer of dual-layer Blu-ray Disc currently available on the market is approximately 5%. Further, the reflectance of the surface of each various optical discs including CD and DVD, other than Blu-ray Disc, is also approximately 5%. As a result, the reflectance of each respective recording layer of the triple-layer optical disc or of the quadruple-layer optical disc, whose recording layer number is larger than the recording layer number of the dual-layer optical disc, is furthermore lowered.

In addition, a signal from the spot on the optical disc is deteriorated resulting from spherical aberration generated by a thickness difference between cover layers, and the FE signal amplitude is lowered. If spherical aberration is attempted to be corrected in order to optimize the spherical aberration of a specific recording layer, a large spherical aberration is generated on the other recording layers, and the amplitude of an FE signal obtained from the other recording layers is lowered. An increase in the recording layer number results in an increase in the layer interval between the recording layer closest to the surface and the recording layer farthest from the surface, which resultantly further lowers the FE signal amplitude by spherical aberration.

Figure 7:
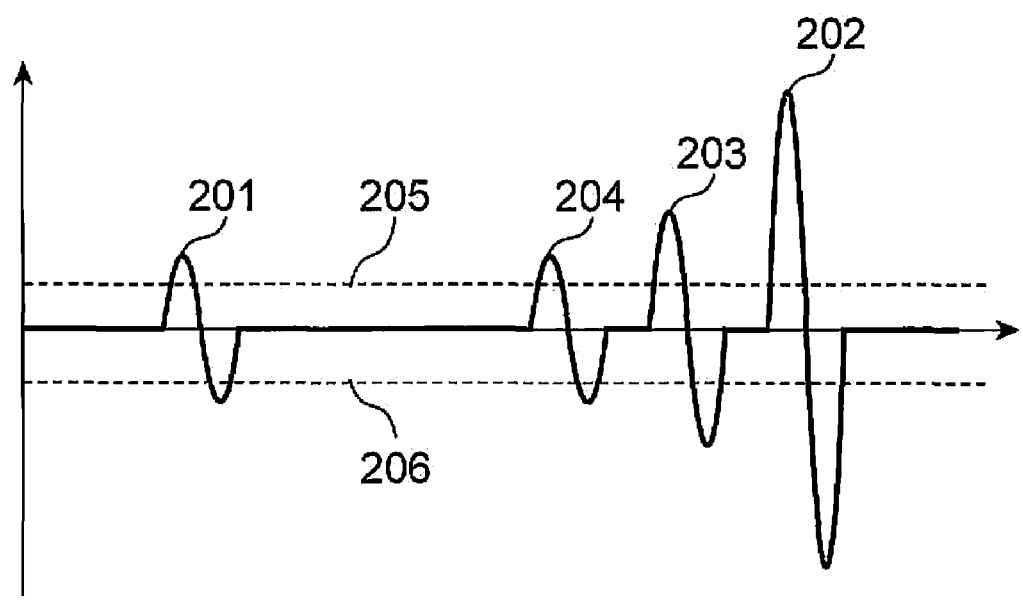
FIG. 7 is a diagram showing FE signals detected from a triple-layer optical disc.
Figure 8:
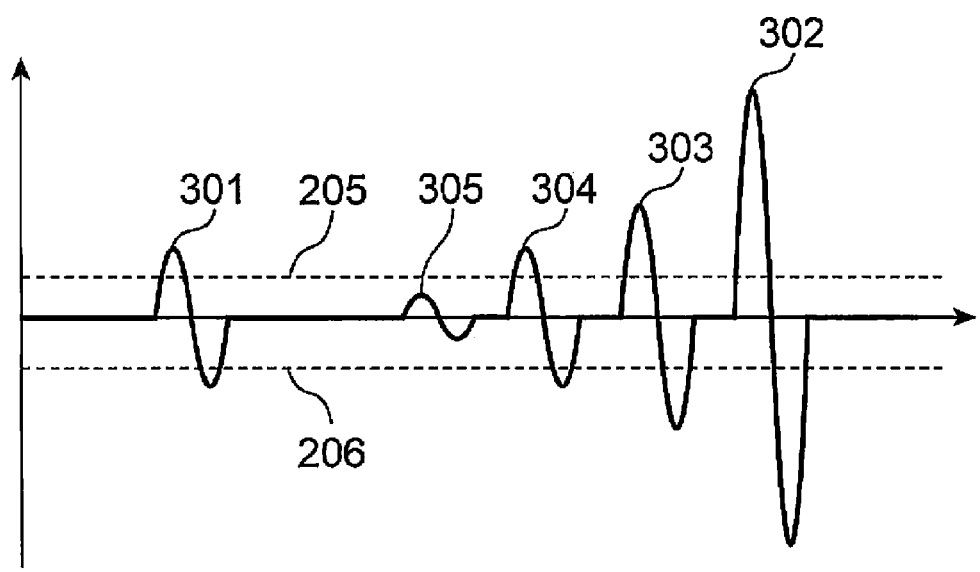
FIG. 8 is a diagram showing FE signals detected from a quadruple-layer optical disc.

For the aforementioned reasons, FE signals obtained when a light beam is incident into a multilayer optical disc are as shown in FIG. 7 and FIG. 8. FIG. 7 is a diagram showing FE signals obtained when a light beam is incident into an optical disc having three recording layers, and FIG. 8 is a diagram showing FE signals obtained when a light beam is incident into an optical disc having four recording layers. The spherical aberration is corrected in such a manner that the spherical aberration on the recording layer farthest from the surface of the optical disc is optimized.

Referring to FIG. 7, the FE signal 201 is an FE signal obtained from the surface of a triple-layer optical disc, and the FE signals 202, 203, 204 are respectively FE signals obtained from the first recording layer, the second recording layer and the third recording layer of the triple-layer optical disc. The triple-layer optical disc has a first recording layer farthest from the surface, a second recording layer second farthest from the surface and a third recording layer closest to the surface. It is possible to count the recording layer number by incrementing the recording layer number by one, each time an FE signal exceeds the plus detection threshold value 205 and then exceeds the minus detection threshold value 206. In the case of FIG. 7, four FE signals corresponding to the surface, the first recording layer, the second recording layer and the third recording layer of the optical disc are counted. Thus, the optical disc loaded in the optical disc device is determined to be a triple-layer optical disc, because three recording layers except for the surface of the optical disc have been detected.

On the other hand, referring to FIG. 8, the FE signal 301 is an FE signal obtained from the surface of a quadruple-layer optical disc, and the FE signals 302, 303, 304, 305 are respectively FE signals obtained from the first recording layer, the second recording layer, the third recording layer and the fourth recording layer of the quadruple-layer optical disc. The quadruple-layer optical disc has a first recording layer farthest from the surface, a second recording layer second farthest from the surface, a third recording layer third farthest from the surface and a fourth recording layer closest to the surface. In case of the quadruple-layer optical disc, the reflectance of the fourth recording layer is low, and a largest spherical aberration is generated on the fourth recording layer. As a result, the FE signal 305 is exceedingly small, as compared with the FE signals corresponding to the other recording layers, and the FE signal 305 does not exceed both of the plus detection threshold value 205 and the minus detection threshold value 206, as the reference values for counting the recording layer number. Accordingly, it is impossible to include the fourth recording layer as a recording layer to be counted.

In the above case, four signals FE corresponding to the surface, the first recording layer, the second recording layer and the third recording layer of the optical disc are counted. Accordingly, if the same idea as applied to the third-layer optical disc shown in FIG. 7 is applied to the case of FIG. 8, three recording layers except for the surface of the optical disc are detected, and the optical disc loaded in the optical disc device is determined to be a triple-layer optical disc. Thus, the loaded optical disc is not accurately determined to be a quadruple-layer optical disc.

As described above, an increase in the recording layer number may make it difficult to securely determine the number of FE signals, which increases the likelihood that the type of the optical disc may not be determined before a focus control operation is performed. Thus, it is difficult to determine the type of the optical disc until the physical information area recorded with the physical information unique to the optical disc is reproduced.

Figure 2A:
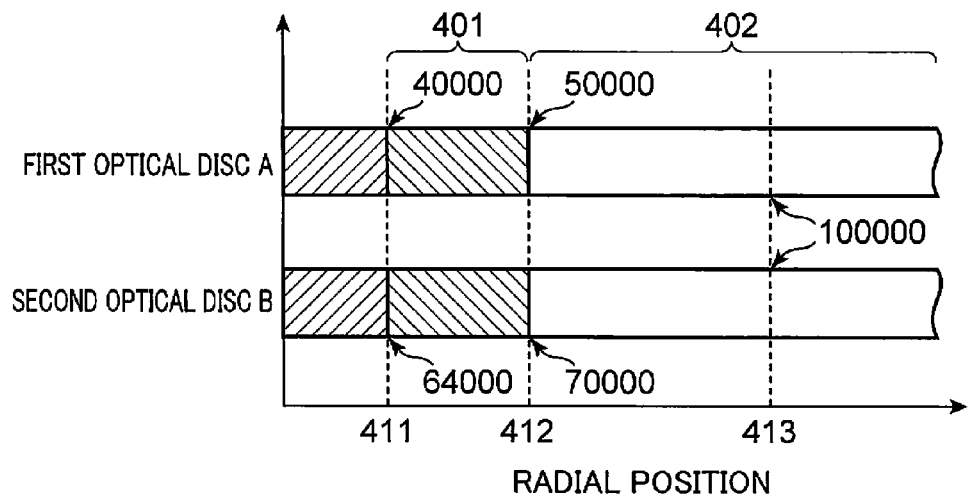
FIG. 2A is a diagram showing a relationship between a physical information area and a user data area, and a radial position in each of a first optical disc and a second optical disc having different recording densities from each other.
Figure 2B:
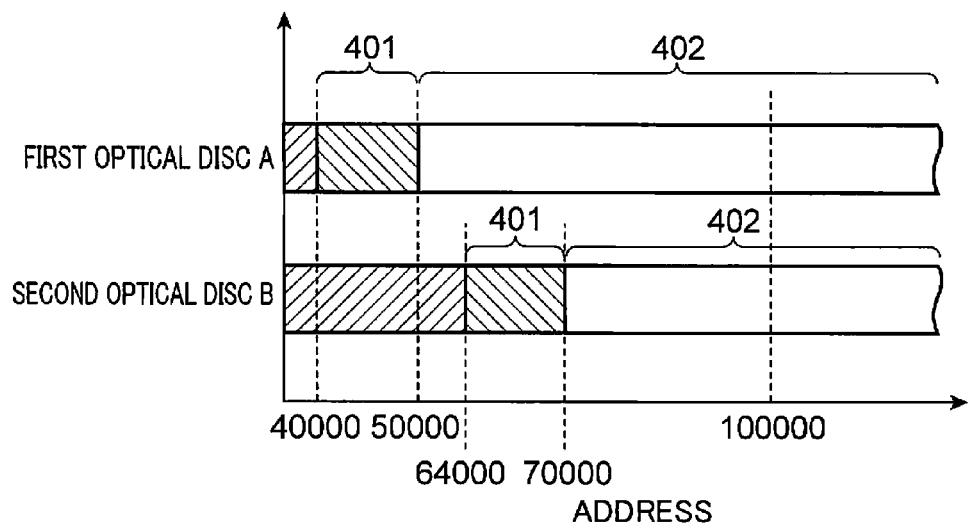
FIG. 2B is a diagram showing a relationship between a physical information area and a user data area, and an address in each of a first optical disc and a second optical disc having different recording densities from each other.

Next, area arrangements of two optical discs A and B whose recording densities are different from each other are described referring to FIGS. 2A and 2B. FIG. 2A is a diagram showing a relationship between a physical information area and a user data area, and a radial position in each of the first optical disc A and the second optical disc B whose recording densities are different from each other, and FIG. 2B is a diagram showing a relationship between a physical information area and a user data area, and an address in each of the first optical disc A and the second optical disc B whose recording densities are different from each other.

Referring to FIG. 2A, each of the optical discs has a physical information area 401 and a user data area 402 whose formats are different from each other. The physical information area 401 and the user data area 402 have address formats different from each other, and once the address reading circuit 52 is set for one of the physical information area 401 and the user data area 402, it is impossible to read the address from the other of the physical information area 401 and the user data area 402. Accordingly, in controlling the optical pickup 11 to move between the two areas i.e. between the physical information area 401 and the user data area 402, it is necessary to move the optical pickup 11 to the vicinity of a target area of the two areas, and then switch the setting of the address reading circuit 52 to the setting for the target area before starting an operation of reading an address.

A physical information start end radial position 411 represents a start end position of a region where the physical information is recorded in the physical information area 401. A physical information terminal end radial position 412 represents a boundary position between the physical information area 401 and the user data area 402. A reference radial position 413 represents a radial position in the user data area 402, and serves as a reference position for reading an address. The reference radial position 413 is a radial position corresponding to the same address among all the possible types of optical discs having recording densities different from each other. Further, referring to FIG. 2A, the recording density of the first optical disc A is set larger than the recording density of the second optical disc B. Further, an inner region with respect to the physical information start end radial position 411 is a region where a track is formed by the same address format as for the physical information area 401, but is a region where physical information itself is not recorded.

In both of the two optical discs A and B whose recording densities are different from each other, the address of the reference radial position 413 is "100000", the address of the physical information start end radial position 411 of the first optical disc A is "40000", the address of the physical information start end radial position 411 of the second optical disc B is "64000", the address of the physical information terminal end radial position 412 of the first optical disc A is "50000", and the address of the physical information terminal end radial position 412 of the second optical disc B is "70000". Further, the actual distance from the reference radial position 413 to the physical information start end radial position 411 is the same between the first optical disc A and the second optical disc B, but the change amount in the address is larger in the first optical disc A whose recording density is higher than the recording density of the second optical disc B.

FIG. 2B shows area arrangements on the two optical discs A and B whose recording densities are different from each other, as described referring to FIG. 2A, on the basis of a reference address. The reference radial position 413 corresponding to the reference address "100000" is the same radial position between the first optical disc A and the second optical disc B, as described referring to FIG. 2A. However, the physical information area 401 on the first optical disc A exists between the address "40000" and the address "50000", and the physical information area 401 on the second optical disc B exists between the address "64000" and "70000". In this way, the physical information areas 401 on the first optical disc A and on the second optical disc B exist substantially at the same position as each other with respect to the radial direction of each respective optical disc, but exist at different positions from each other in terms of the address space.

The seek controller 53 instructs the controller 61 to perform a seek operation to a predetermined reference address in the user data area 402. Upon receiving the instruction, the controller 61 causes the optical pickup 11 to perform a seek operation to the predetermined reference address in the user data area 402 via the tracking actuator driving circuit 22.

The seek controller 53 instructs the controller 61 to perform a seek operation from the reference address to a predetermined target address in the physical information area 401. Upon receiving the instruction, the controller 61 causes the optical pickup 11 to perform a seek operation from the reference address to the predetermined target address in the physical information area 401 via the tracking actuator driving circuit 22. The seek controller 53 performs a seek operation from the reference address to the predetermined target address in the physical information area 401, using a conversion coefficient corresponding to the first optical disc A between the address and the radial position thereof.

The address reading circuit 52 reads the current address at a position sought by the seek controller 53.

The optical disc type determinator 54 determines the type of the optical disc, based on the current address read by the address reading circuit 52. The optical disc type determinator 54 judges whether the current address read by the address reading circuit 52 is equal to or larger than a predetermined threshold value. In the case where the current address is judged to be smaller than the predetermined threshold value, the optical disc type determinator 54 determines that the loaded optical disc is the first optical disc A; and in the case where the current address is judged to be equal to or larger than the predetermined threshold value, the optical disc type determinator 54 determines that the loaded optical disc is the second optical disc B.

Further, the seek controller 53 performs a seek operation to a target address in the physical information area 401 in accordance with the optical disc type determined by the optical disc type determinator 54. In the case where the loaded optical disc is determined to be the second optical disc B by the optical disc type determinator 54, the seek controller 53 performs a seek operation from the current address read by the address reading circuit 52 to a predetermined target address in the physical information area 401, using a conversion coefficient corresponding to the second optical disc B between the address and the radial position thereof.

Figure 6:
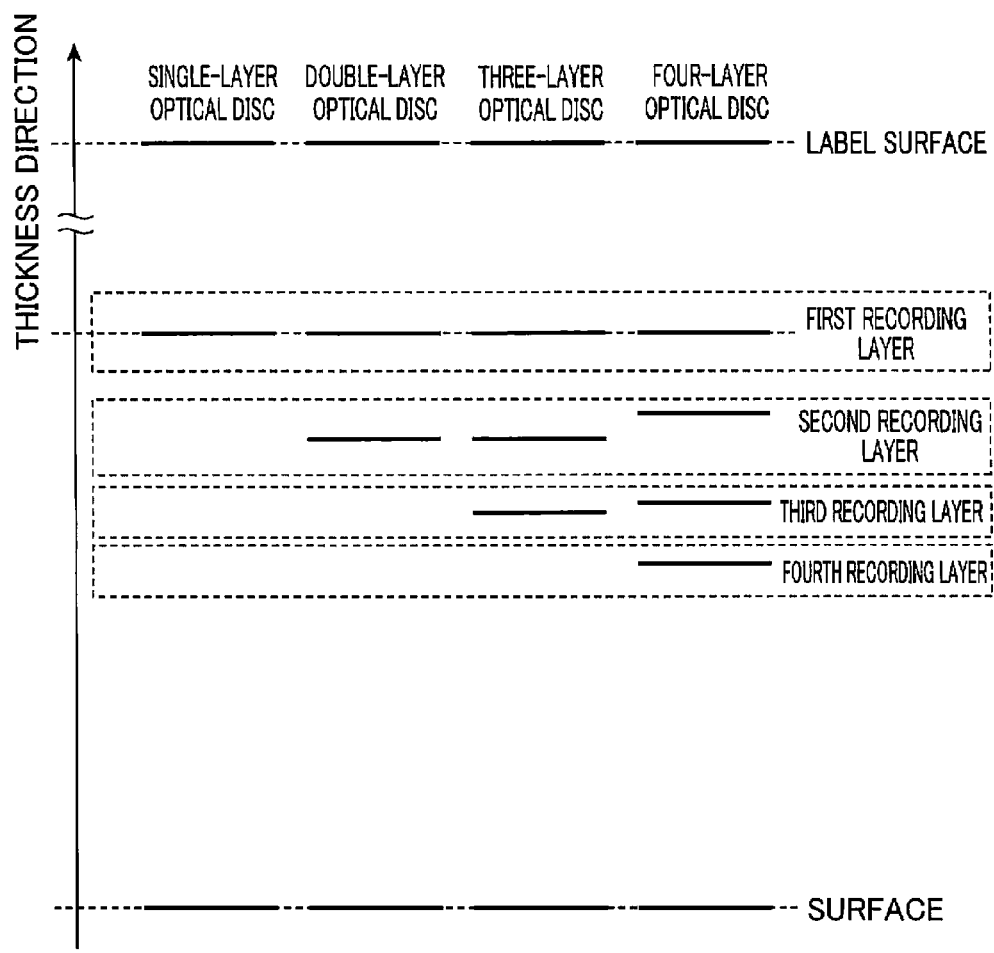
FIG. 6 is a diagram showing an example of an arrangement on a surface and recording layers of each of a single-layer optical disc, a dual-layer optical disc, a triple-layer optical disc and a quadruple-layer optical disc with respect to the thickness direction thereof.

There is no need that the physical information area 401 should exist in all the recording layers of the optical disc. The physical information area 401 may be formed only in a recording layer at a common position between the optical discs whose recording layer numbers differ from each other, e.g. in the first recording layer shown in FIG. 6.

Figure 3:
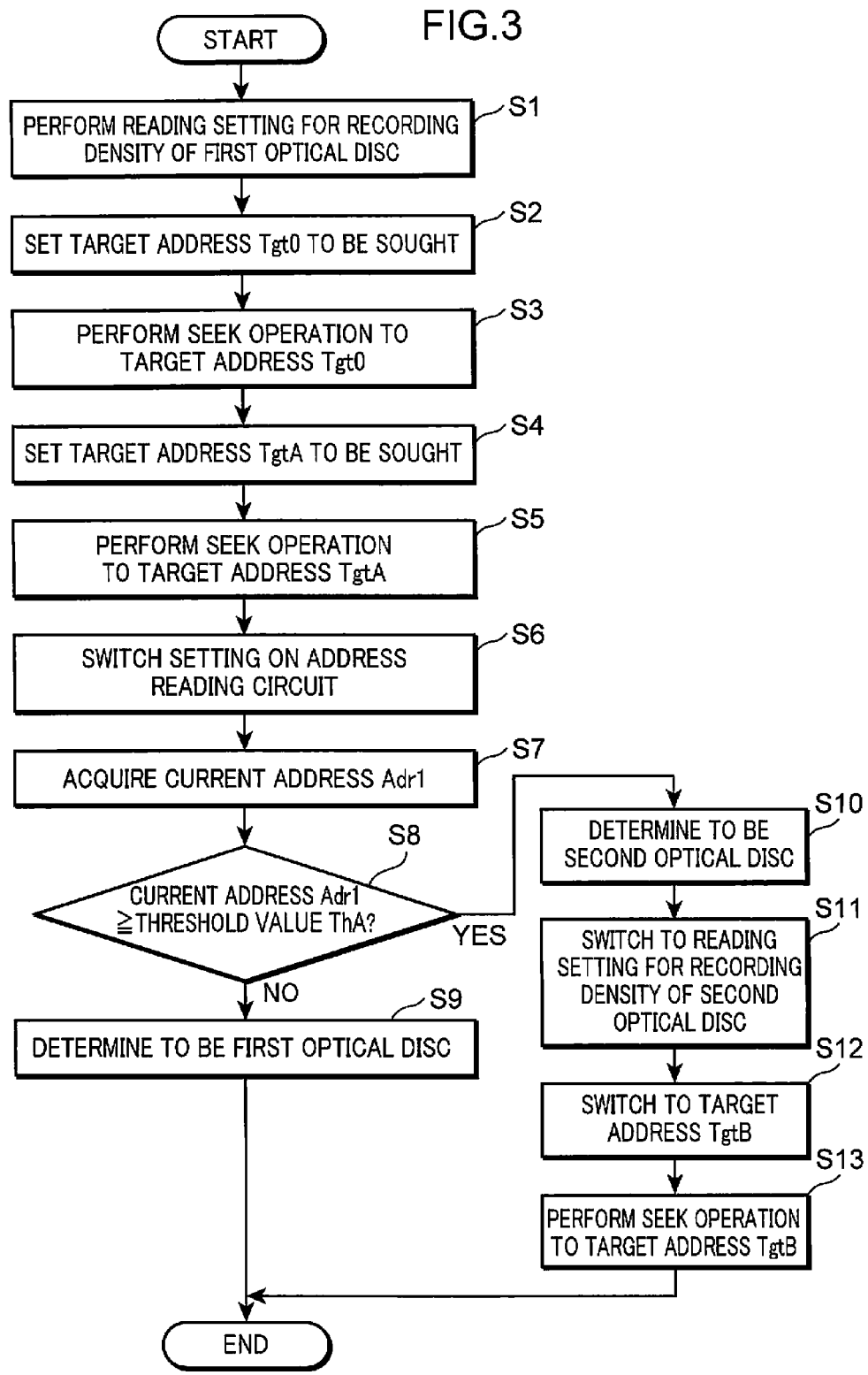
FIG. 3 is a flowchart for describing an operation to be performed by the optical disc device in the first embodiment of the invention.

Next, a sequence of securely performing a seek operation to the physical information area 401 is described referring to FIG. 3. FIG. 3 is a flowchart for describing an operation to be performed by the optical disc device in the first embodiment of the invention. In FIG. 3, the optical disc device discriminates whether the loaded optical disc is one of the two optical discs i.e. the first optical disc A having three recording layers, and the second optical disc B having four recording layers.

First of all, in starting a seek operation, a target address to be sought cannot be determined, unless the recording density is specified. In view of this, the seek controller 53 performs setting for reading either one of the recording densities of the two optical discs. The setting for reading the recording density is a setting for a conversion coefficient which is determined depending on the recording density between the radial position and the address of the optical disc. The seek controller 53 performs setting for reading the recording density of the first optical disc A (Step S1).

Next, the seek controller 53 sets the reference address "100000" corresponding to the reference radial position 413, as a target address Tgt0 to be sought (Step S2). Then, the tracking actuator driving circuit 22 drives the tracking actuator 3 to cause the optical pickup 11 to seek to the target address Tgt0 in the user data area 402 (Step S3). Causing the optical pickup 11 to seek to the reference radial position 413 at a first stage is advantageous in enhancing stability of a seek operation in the optical disc device which is designed to load plural types of optical discs having different recording densities from each other. Specifically, the relationship between the address at a current position and the radial position is not determined in the region other than the reference radial position 413 in a condition that it is difficult or impossible to determine whether the recording density of the optical disc loaded in the optical disc device is the recording density of the first optical disc A or of the second optical disc B. This makes it impossible to accurately perform a seek operation thereafter.

Then, the seek controller 53 sets the address "40000" corresponding to the physical information start end radial position 411 on the first optical disc A, as a target address TgtA to be sought (Step S4). Then, the tracking actuator driving circuit 22 drives the tracking actuator 3 to cause the optical pickup 11 to seek from the reference address in the user data area 402 to the target area TgtA in the physical information area 401 (Step S5).

Then, the microcomputer 51 causes the address reading circuit 52 to switch to the setting based on which an address in the physical information area 401 is readable (Step S6). The address information is recorded as a modulated wobble signal, and the address information in the physical information area 401, and the address information in the user data area 402 are recorded with different modulation formats from each other. Accordingly, the address reading circuit 52 switches the setting to a wobble signal decoding setting for the physical information area 401. Specifically, the address reading circuit 52 switches the setting from the setting for reading an address from the user data area 402 to the setting for reading an address from the physical information area 401.

The order between a seek operation to the physical information start end radial position 411, and switching the setting of the address reading circuit 52 is not limited to the one in the above sequence. Alternatively, the setting of the address reading circuit 52 may be switched after an address is read by performing a seek operation to the reference radial position 413, and before an address is read at the physical information start end radial position 411.

Next, the address reading circuit 52 reads a current address Adr1 at the physical information start end radial position 411 (Step S7). Then, the optical disc type determinator 54 compares between the read current address Adr1 and a predetermined threshold value ThA. Specifically, the optical disc type determinator 54 judges whether the read current address Adr1 is equal to or larger than the predetermined threshold value ThA (Step S8). The threshold value ThA should be a value, based on which the address at the physical information end radial position 411 on the first optical disc A is discriminated from the address at the physical information end radial position 411 on the second optical disc B, and the threshold value ThA is designed, taking into account that a read address may vary in the case where there is a movement error in moving the optical pickup 11 to the physical information start end radial position 411. In this embodiment, it is desirable to set the threshold value ThA to a value between "40000" and "64000".

In the case where the read current address Adr1 is judged to be smaller than the threshold value ThA (NO in Step S8), the optical disc type determinator 54 determines that the optical disc that is currently loaded in the optical disc device is the first optical disc A (Step S9). In the case where the read current address Adr1 is displaced from the target address "40000", the seek controller 53 causes the optical pickup 11 to perform a further seek operation.

On the other hand, in the case where the read current address Adr1 is judged to be equal to or larger than the threshold value ThA (YES in Step S8), the optical disc type determinator 54 determines that the optical disc that is currently loaded in the optical disc device is the second optical disc B (Step S10). Then, the seek controller 53 switches the setting from the setting for reading the recording density of the first optical disc A to the setting for reading the recording density of the second optical disc B (Step S11). Then, the seek controller 53 switches the currently set target address TgtA to be sought to the address corresponding to the physical information start end radial position 411 on the second optical disc B (Step S12). Specifically, the seek controller 53 sets the address "64000" corresponding to the physical information start end radial position 411 on the second optical disc B, as a target address TgtB to be sought.

Lastly, the tracking actuator driving circuit 22 drives the tracking actuator 3 to cause the optical pickup 11 to seek to the target address TgtB in the physical information area 401 (Step S13). In this way, the optical pickup 11 reaches the targeted physical information start end radial position 411.

By performing the above steps in the sequence, it is possible to cause the optical pickup 11 to securely perform a seek operation to the physical information area 401 even in a condition that it is difficult or impossible to accurately determine the recording density.

In the processing of switching the setting of the address reading circuit 52 in Step S6, the setting is switched to the setting for reading the recording density of the first optical disc A. Alternatively, the setting may be switched to the setting for reading an intermediate recording density between the recording density of the first optical disc A and the recording density of the second optical disc B, and the setting may be switched to the setting for reading the recording density of the first optical disc A after the loaded optical disc has been determined to be the first optical disc A by the address comparison processing in Step S8. The above modification is advantageous in stably acquiring a current address, even if the loaded optical disc is determined to be the second optical disc B.

In the case where the current address cannot be read by the current address reading processing in Step S7, the setting of the address reading circuit 52 may be changed to the setting for reading the recording density of the second optical disc B, and the current address reading processing may be performed again.

Further, in FIG. 3, two types of optical discs i.e. the first optical disc A and the second optical disc B are discriminated from each other. Alternatively, three types of optical discs i.e. a first optical disc A, a second optical disc B and a third optical disc C may be discriminated from each other. In the case where three types of optical discs are discriminated from each other, the optical disc type determinator 54 may judge whether the read current address Adr1 is equal to or larger than a threshold value ThB which is larger than the predetermined threshold value ThA, in the case where the read current address Adr1 is judged to be equal to or larger than the predetermined threshold value ThA. Then, in the case where the read current address Adr1 is judged to be smaller than the threshold value ThB, the optical disc type determinator 54 may determine that the optical disc that is currently loaded in the optical disc device is the second optical disc B; and in the case where the read current address Adr1 is judged to be equal to or larger than the threshold value ThB, the optical disc type determinator 54 may determine that the optical disc that is currently loaded in the optical disc device is the third optical disc C. The above operation is performed based on the premise that the recording density of the first optical disc A is set larger than the recording density of the second optical disc B, and that the recording density of the second optical disc B is set larger than the recording density of the third optical disc C.

In the case where four or more types of optical discs are discriminated from each other, the number of threshold values may be set in accordance with the number of types of optical discs to be discriminated, and the number of steps of judging between the current address and the threshold value is set in accordance with the number of types of optical discs to be discriminated.

(Second Embodiment)

In this section, an optical disc device in the second embodiment of the invention is described.

Since the arrangement of the optical disc device in the second embodiment is substantially the same as that of the optical disc device in the first embodiment, detailed description thereof is omitted herein.

A microcomputer 51 provisionally discriminates the type of the optical disc before a seek controller 53 performs a seek operation to a reference address. The seek controller 53 switches the value of a target address, based on a provisional discrimination result on the type of the optical disc by the microcomputer 51. Further, the microcomputer 51 provisionally discriminates the type of the optical disc, based on at least one of the recording layer number derived from the number of focus error signals, the amplitude of a tracking error signal and the frequency of a wobbling groove.

Figure 4:
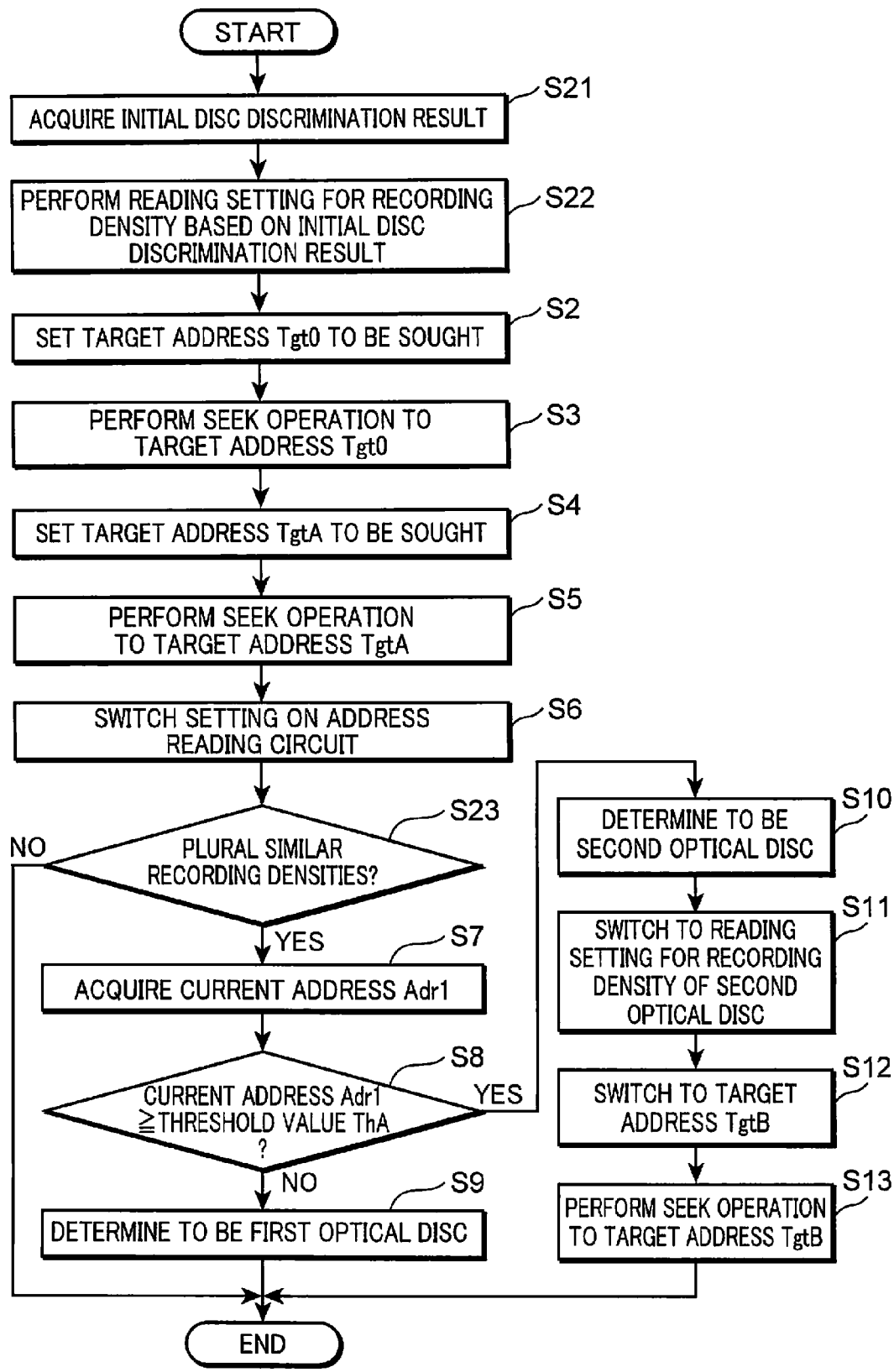
FIG. 4 is a flowchart for describing an operation to be performed by an optical disc device in a second embodiment of the invention.

A sequence of securely performing a seek operation to a physical information area 401 is described referring to the flowchart of FIG. 4. FIG. 4 is a flowchart for describing an operation to be performed by the optical disc device in the second embodiment of the invention. Since the steps in FIG. 4 as indicated by the same step numbers as those in the flowchart of FIG. 3 represent the same processings to be performed, description thereof is omitted herein.

Firstly, the microcomputer 51 acquires an initial disc discrimination result (Step S21). The initial disc discrimination result is information on the type of the optical disc which has been determined using e.g. the recording layer number derived from the number of FE signals, the amplitude of a tracking error signal generated by the tracking error signal generator 32, or the frequency of a wobbling groove, as described in the foregoing embodiment. Next, the seek controller 53 performs setting for reading the recording density (the recording density X) in accordance with the type of the optical disc specified based on the initial disc discrimination result (Step S22).

The microcomputer 51 stores in advance a correlation between the recording layer number derived from the number of FE signals, the amplitude of a tracking error signal, or the frequency of a wobbling groove; and the type of the optical disc (i.e. the recording density).

Thereafter, in Step S23, the microcomputer 51 compares between the recording density X set in Step S22, and the recording density of the optical disc which is estimated to be loaded in the optical disc device; and judges whether there exist plural types of optical discs whose recording densities are similar to the recording density X. If it is judged that there exist plural types of optical discs whose recording densities are similar to the recording density X (YES in Step S23), the routine proceeds to the processing in Step S7.

If, on the other hand, it is judged that there do not exist plural types of optical discs whose recording densities are similar to the recording density X (NO in Step S23), the operation is terminated by omitting the processings in Step S7 through Step S13.

The above operation to be performed is described by taking an example in the case where initial disc discrimination is performed using the frequency of a wobbling groove.

Let it be assumed that there are five kinds of recording densities of optical discs which are estimated to be loaded in the optical disc device i.e. 25 GB, 28 GB, 32 GB, 33 GB and 40 GB, and the determination criterion set based on measurement variation on the frequency of a wobbling groove is 10%. In the case where the recording density X obtained in Step S22 is 25 GB, there exists only the optical disc having the recording density of 25 GB, as the optical disc having a recording density between 22.5 GB and 27.5 GB, which correspond to ±10% of 25 GB. Accordingly, in this case, the microcomputer 51 judges that there do not exist plural types of optical discs whose recording densities are similar to the recording density X. Further, in the case where the recording density X obtained in Step S22 is 33 GB, there exists the optical disc whose recording density is 32 GB, in addition to the optical disc whose recording density is 33 GB, as the optical discs whose recording densities are between 30.0 GB and 36.3 GB, which correspond to ±10% of 33 GB. Accordingly, in this case, the microcomputer 51 judges that there exist plural types optical discs whose recording densities are similar to the recording density X.

The above judgment result makes it possible to shorten the processing time required in the case where there do not exist plural types of optical discs whose recording densities are similar to the recording density X, by performing the processings in Step S7 through Step S13 only in the case where there exist plural types of optical discs whose recording densities are similar to the recording density X.

Further, as shown in FIG. 8, it is difficult to accurately determine the type of the optical disc in advance, in the case where the optical disc has a recording layer of an extremely low reflectance. However, as far as the optical disc does not have a recording layer of an extremely low reflectance, it is possible to specify an accurate address, as a target address to be sought. Thus, the frequency of executing the processings in Step S10 through Step S13 is reduced, which makes it possible to perform a high-speed optical disc discrimination processing.

(Third Embodiment)

In this section, an optical disc device in the third embodiment of the invention is described.

Since the arrangement of the optical disc device in the third embodiment is substantially the same as that in the first embodiment, detailed description thereof is omitted herein.

Plural types of optical discs are reproduced by using a laser light source 9 configured such that a predetermined reproduction power is set for each respective type of optical disc. A microcomputer 51 switches to a lowest reproduction power of the reproduction powers for the plural types of optical discs, before a seek controller 53 performs a seek operation to a target address.

Further, the plural types of optical discs are reproduced using the laser light source 9 configured such that a predetermined high-frequency component for each respective type of optical disc is superimposed on a drive current. The microcomputer 51 stops the operation of superimposing a high-frequency component, and drives the laser light source 9 by a direct current, before the seek controller 53 performs a seek operation to a target address.

Further, the plural types of optical discs are driven and rotated at a predetermined linear velocity for each respective type of optical disc. The microcomputer 51 drives and rotates the optical disc with a highest linear velocity of the linear velocities for the plural types of optical discs, before the seek controller 53 performs a seek operation to a target address.

Figure 5:
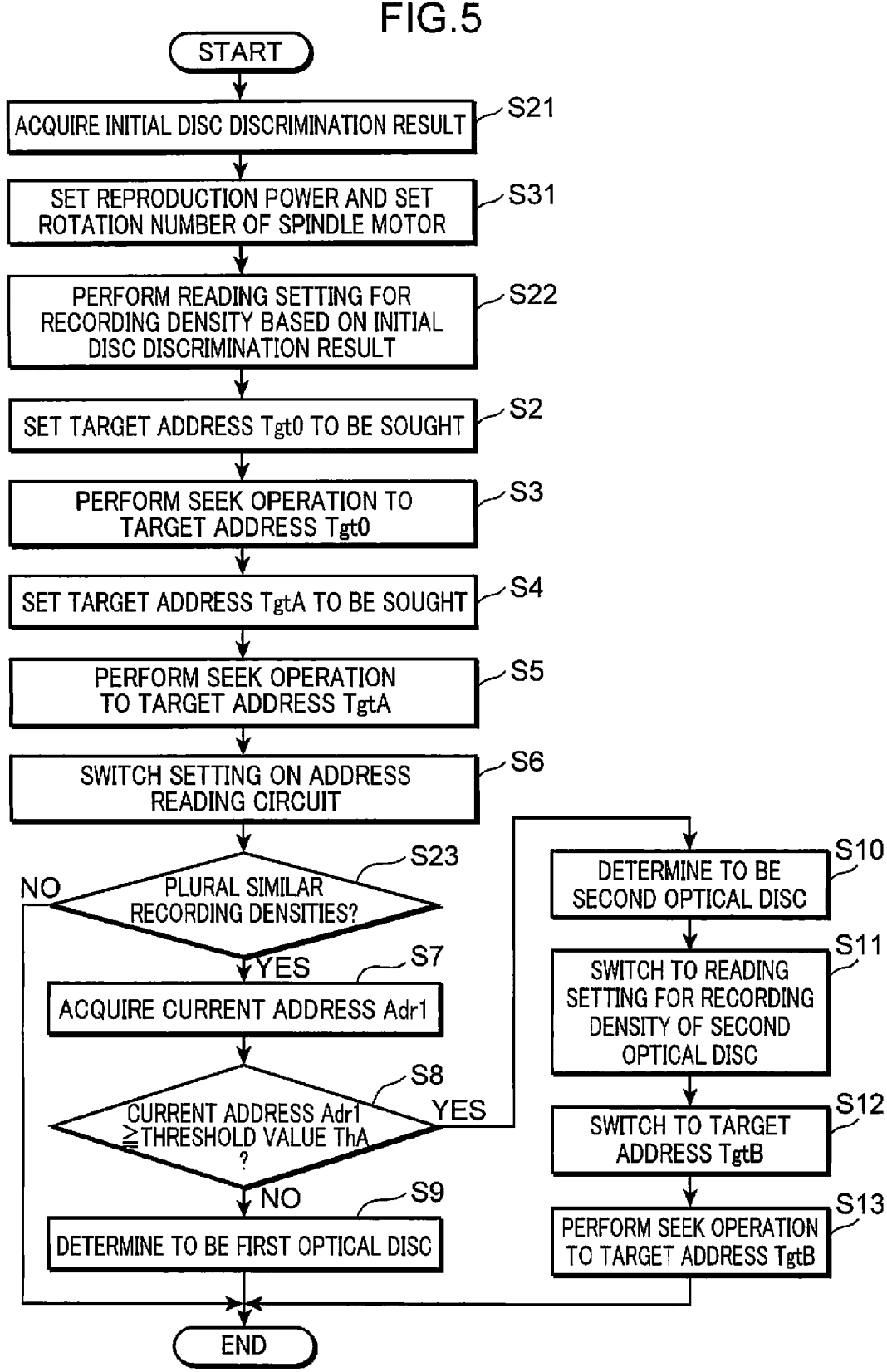
FIG. 5 is a flowchart for describing an operation to be performed by an optical disc device in a third embodiment of the invention.

A sequence of securely performing a seek operation to a physical information area 401 is described referring to the flowchart of FIG. 5. FIG. 5 is a flowchart for describing an operation to be performed by the optical disc device in the third embodiment of the invention. Since the steps in FIG. 5 as indicated by the same step numbers as those in the flowcharts of FIG. 3 and FIG. 4 represent the same processings to be performed, description thereof is omitted herein.

An increase in the recording layer number results in lowering the reflectance of the recording layer, as described above. It is necessary to drive the laser light source to emit laser light by e.g. increasing the output of the laser light source, or by controlling a laser driving circuit to superimpose a high-frequency component on a drive current in order to secure a proper S/N ratio of a signal representing reflected light from the optical disc.

Further, in the case where the optical disc device records or reproduces information on or from plural types of optical discs whose recording densities are different from each other, if a fixed reading speed is attempted to be set for all the possible types of optical discs having different recording densities from each other, the rotation speed of the spindle motor 71 is required to be changed each time the recording density changes. If an optical disc having a high recording density is loaded, it is necessary to rotate the spindle motor 71 at a rotation speed lower than the rotation speed for an optical disc having a recording density lower than the recording density of the high-density optical disc.

Further, in an optical disc device, there is known a phenomenon called reproduction light deterioration that a recorded signal gradually diminishes, if the output of the laser light source 9 is increased over a prescribed value, or if the rotation speed of the spindle motor 71 is unduly lowered. Further, superimposing a high-frequency component by the laser driving circuit 24 may worsen the signal deterioration resulting from reproduction light deterioration in some of the types of optical discs.

In view of the above, it is necessary to properly change the output of a light beam to be irradiated onto the optical disc, and the rotation speed of the spindle motor 71, depending on the type of the optical disc loaded in the optical disc device.

As described above, however, it is necessary to read out the physical information in order to accurately determine the recording layer number or the recording density. In performing the readout operation, it is necessary to perform a seek operation by irradiating a light beam onto a track on the optical disc, where the physical information is estimated to have been recorded.

If the recording layer number or the recording density is erroneously determined, and the output of the laser light source is unduly increased, or the rotation speed of the spindle motor 71 is unduly lowered, based on the erroneous determination result, the information recorded on the optical disc may be inadvertently erased.

In view of the above, in the flowchart of FIG. 5, the microcomputer 51 controls the laser light source 9 to DC-drive at a lowest reproduction power of the reproduction powers for all the possible types of optical discs which are estimated to be loaded in the optical disc device, onto the optical disc loaded in the optical disc device, with stopping superimposition of a high-frequency component; and sets the rotation number of the spindle motor 71 to a highest rotation number, based on the initial disc discrimination result (Step S31). In this state, a seek operation to the physical information area 401 is performed. It is desirable to perform the processing in Step S31, before focus control is started by irradiating a light beam onto the optical disc.

By performing the above operation, it is possible to securely perform a seek operation to the physical information area 401 without inadvertently erasing the information on the optical disc, and to accurately determine the type of the optical disc by reading out the physical information, even in a condition that it is difficult or impossible to accurately determine the recording layer number or the recording density, whereby an optimum light beam output and an optimum rotation number of the spindle motor 71 can be obtained.

In the case where the combination between the recording density of an estimated type of optical disc, and the prescribed reproduction power is configured such that the reproduction power is increased as the recording density is increased, the reproduction power for the optical disc having a lowest recording density may be set.

Further, in the case where there is no setting on stopping superimposition of a high-frequency component in the setting and combination on the reproduction powers for estimated types of optical discs, it is possible to stably read an address by setting a high-frequency component in such a manner that the average reproduction power becomes an estimated lowest light beam output, and that the peak power level by superimposition of a high-frequency component becomes an estimated lowest peak output of light beam or less.

In the foregoing first through third embodiments, an operation to be performed in the case where two types of optical discs having recording densities different from each other has been described referring to FIGS. 2A and 2B. The invention is also applicable to a case where the number of types of recording densities is increased by e.g. manufacturing an optical disc whose recording layer number is increased, and whose recording density is different from the existing recording densities in order to achieve a further increase in the recording capacity. The current address obtained in the processing (Step S7) of acquiring a current address in FIGS. 3 through 5 differs depending on the recording density. Accordingly, it is possible to meet the requirement for the development of increasing the number of kinds of recording densities by preparing plural judgment criteria (threshold values) to be used in the address comparing processing in Step S8.

Further, it may be possible to perform a seek operation to the physical information area 401 after the recording density is determined based on an address read by a seek operation to another address in the user data area 402 e.g. the address "80000", before a seek operation from the reference address in the user data area 402 to the physical information area 401 is performed. However, as described in the first through third embodiments, the first through third embodiments are advantageous in performing a seek operation to the physical information area 401 at a high speed, because it is possible to omit a seek operation to another address in the user data area 402 by performing a seek operation from the reference address in the user data area 402 to the physical information area 401.

The foregoing embodiments mainly include the invention having the following features.

An optical disc discrimination method according to an aspect of the invention is an optical disc discrimination method for discriminating, from a plurality of types of optical discs having recording densities different from each other, the type of an optical disc loaded in an optical disc device for reading information recorded on the optical disc or for recording information on the optical disc by irradiating a light beam onto the optical disc. The optical disc has a user data area and a physical information area having formats different from each other. The optical disc discrimination method comprises a first seeking step of performing a seek operation to a predetermined reference address in the user data area; a second seeking step of performing a seek operation from the reference address sought in the first seeking step to a predetermined target address in the physical information area; an address reading step of reading a current address at a position sought in the second seeking step; and an optical disc type determination step of determining the type of the optical disc loaded in the optical disc device, based on the current address read in the address reading step.

With the above arrangement, the optical disc has the user data area and the physical information area having the formats different from each other. In the first seeking step, the seek operation to the predetermined reference address in the user data area is performed; and in the second seeking step, the seek operation from the reference address sought in the first seeking step to the predetermined target address in the physical information area is performed. In the address reading step, the current address at the position sought in the second seeking step is read; and in the optical disc type determination step, the type of the optical disc loaded in the optical disc device is determined, based on the current address read in the address reading step.

Thus, it is possible to securely perform a seek operation to the physical information area, and to securely discriminate the type of the optical disc, even in a condition that the type of the optical disc loaded in the optical disc device is not accurately determined.

Preferably, the optical disc discrimination method may further comprise a third seeking step of performing a seek operation to the target address in the physical information area in accordance with the type of the optical disc determined in the optical disc type determination step.

With the above arrangement, in the third seeking step, the seek operation to the target address in the physical information area is performed in accordance with the type of the optical disc determined in the optical disc determination step. This enables to securely perform a seek operation to the physical information area to thereby read out the information recorded in the physical information area.

Preferably, in the optical disc discrimination method, the plurality of types of optical discs may include a first optical disc and a second optical disc having recording densities different from each other; in the second seeking step, the seek operation from the reference address sought in the first seeking step to the predetermined target address in the physical information area may be performed, using a conversion coefficient corresponding to the first optical disc between an address and a radial position of the optical disc; in the optical disc type determination step, judgment may be made as to whether the current address read in the address reading step is equal to or larger than a predetermined threshold value, the loaded optical disc may be determined to be the first optical disc in the case where the current address is judged to be smaller than the predetermined threshold value, and the loaded optical disc may be determined to be the second optical disc in the case where the current address is judged to be equal to or larger than the predetermined threshold value; and in the third seeking step, the seek operation from the current address read in the address reading step to the predetermined target address in the physical information area may be performed, using a conversion coefficient corresponding to the second optical disc between an address and a radial position of the optical disc, in the case where the loaded optical disc is determined to be the second optical disc in the optical disc type determination step.

With the above arrangement, the plurality of types of optical discs include the first optical disc and the second optical disc having the recording densities different from each other. Further, in the second seeking step, the seek operation from the reference address sought in the first seeking step to the predetermined target address in the physical information area is performed, using the conversion coefficient corresponding to the first optical disc between the address and the radial position of the optical disc. Then, in the optical disc type determination step, judgment is made as to whether the current address read in the address reading step is equal to or larger than the predetermined threshold value. In the judgment, in the case where the current address is judged to be smaller than the predetermined threshold value, the loaded optical disc is determined to be the first optical disc; and in the case where the current address is judged to be equal to or larger than the predetermined threshold value, the loaded optical disc is determined to be the second optical disc. Then, in the third seeking step, in the case where the loaded optical disc is determined to be the second optical disc in the optical disc type determination step, the seek operation from the current address read in the address reading step to the predetermined target address in the physical information area is performed, using the conversion coefficient corresponding to the second optical disc between the address and the radial position of the optical disc.

Thus, it is possible to easily discriminate whether the loaded optical disc is the first optical disc or the second optical disc by causing the optical disc device to perform a seek operation, using the conversion coefficient corresponding to the first optical disc, out of the first optical disc and the second optical disc between the address and the radial position of the optical disc.

Preferably, the optical disc discrimination method may further comprise a provisional discrimination step of provisionally discriminating the type of the optical disc before the seek operation to the reference address is performed in the first seeking step, wherein in the second seeking step, a value of the target address is switched, based on a provisional discrimination result on the type of the optical disc in the provisional discrimination step.

With the above arrangement, in the provisional discrimination step, the type of the optical disc is provisionally discriminated, before the seek operation to the reference address is performed in the first seeking step. In the second seeking step, the value of the target address is switched, based on the provisional discrimination result on the type of the optical disc in the provisional discrimination step.

Thus, the type of the optical disc is provisionally discriminated, before the first seeking step is performed. This enables to precisely perform a seek operation to the predetermined target address in the physical information area in the second seeking step.

Preferably, according to the optical disc discrimination method, in the provisional discrimination step, the type of the optical disc may be provisionally discriminated based on at least one of the recording layer number derived from the number of focus error signals, the amplitude of a tracking error signal and the frequency of a wobbling groove.

With the above arrangement, the type of the optical disc can be provisionally discriminated, based on at least one of the recording layer number derived from the number of focus error signals, the amplitude of a tracking error signal and the frequency of a wobbling groove.

Preferably, in the optical disc discrimination method, the plurality of types of optical discs may be reproduced using a light source configured such that a predetermined reproduction power is set for the each respective type of optical disc, and the optical disc discrimination method may further comprise a reproduction power switching step of switching the reproduction power to a lowest reproduction power of the reproduction powers for the plurality of types of optical discs, before the seek operation to the target address is performed in the second seeking step.

With the above arrangement, the plurality of types of optical discs are reproduced using the light source configured such that the predetermined reproduction power is set for the each respective type of optical disc. Then, in the reproduction power switching step, the light source is switched to the lowest reproduction power of the reproduction powers for the plurality of types of optical discs, before the seek operation to the target address is performed in the second seeking step.

Thus, the light source is switched to the lowest reproduction power of the reproduction powers for the plurality of types of optical discs, before the seek operation to the target address is performed in the second seeking step. This enables to securely perform a seek operation to the physical information area without inadvertently erasing the information on the optical disc, even in a condition that it is difficult or impossible to accurately determine the type of the loaded optical disc.

Preferably, in the optical disc discrimination method, the plurality of types of optical discs may be reproduced using a light source configured such that a predetermined high-frequency component for the each respective type of optical disc is superimposed on a drive current, and the optical disc discrimination method may further comprise a direct-current driving step of stopping superimposition of a high-frequency component and of driving the light source by a direct current, before the seek operation to the target address is performed in the second seeking step.

With the above arrangement, the plurality of types of optical discs are reproduced using the light source configured such that the predetermined high-frequency component for the each respective type of optical disc is superimposed on a drive current. Then, in the direct-current driving step, superimposition of the high-frequency component is stopped, and the light source is driven by a direct current, before the seek operation to the target address is performed in the second seeking step.

Thus, superimposition of the high-frequency component is stopped, and the light source is driven by a direct current, before the seek operation to the target address is performed in the second seeking step. This enables to securely perform a seek operation to the physical information area without inadvertently erasing the information on the optical disc, even in a condition that it is difficult or impossible to accurately determine the type of the loaded optical disc.

Preferably, in the optical disc discrimination method, the optical disc of each respective type may be driven and rotated at a predetermined linear velocity, and the optical disc discrimination method may further comprise a rotation driving step of driving and rotating the optical disc at a highest linear velocity of the linear velocities for the plurality of types of optical discs.

With the above arrangement, the optical disc of the each respective type is driven and rotated at the predetermined linear velocity. In the rotation driving step, the optical disc is driven and rotated at the highest linear velocity of the linear velocities for the plurality of types of optical discs, before the seek operation to the target address is performed in the second seeking step.

Thus, the optical disc is driven and rotated at the highest linear velocity of the linear velocities for the plurality of types of optical discs, before the seek operation to the target address is performed in the second seeking step. This enables to securely perform a seek operation to the physical information area without inadvertently erasing the information on the optical disc, even in a condition that it is difficult or impossible to accurately determine the type of the loaded optical disc.

An optical disc device according to another aspect of the invention is an optical disc device for reading information recorded on one of a plurality of types of optical discs having recording densities different from each other, or for recording information on the optical disc by irradiating a light beam onto the optical disc. The optical disc has a user data area and a physical information area having formats different from each other. The optical disc device comprises a first seeking section which performs a seek operation to a predetermined reference address in the user data area; a second seeking section which performs a seek operation from the reference address sought by the first seeking section to a predetermined target address in the physical information area; an address reading section which reads a current address at a position sought by the second seeking section; and an optical disc type determination section which determines the type of the optical disc loaded in the optical disc device, based on the current address read by the address reading section.

With the above arrangement, the optical disc has the user data area and the physical information area having the formats different from each other. The first seeking section performs the seek operation to the predetermined reference address in the user data area, and the second seeking section performs the seek operation from the reference address sought by the first seeking section to the predetermined target address in the physical information area. The address reading section reads the current address at the position sought by the second seeking section, and the optical disc type determination section determines the type of the optical disc loaded in the optical disc device, based on the current address read by the address reading section.

Thus, it is possible to securely perform a seek operation to the physical information area, and to securely discriminate the type of the optical disc, even in a condition that it is difficult or impossible to accurately determine the type of the loaded optical disc.

An integrated circuit according to yet another aspect of the invention is an integrated circuit for discriminating, from a plurality of types of optical discs having recording densities different from each other, the type of an optical disc loaded in an optical disc device for reading information from the optical disc or for recording information on the optical disc by irradiating a light beam onto the optical disc. The optical disc has a user data area and a physical information area having formats different from each other. The integrated circuit comprises a first seeking circuit which performs a seek operation to a predetermined reference address in the user data area; a second seeking circuit which performs a seek operation from the reference address sought by the first seeking circuit to a predetermined target address in the physical information area; an address reading circuit which reads a current address at a position sought by the second seeking circuit; and an optical disc type determination circuit which determines the type of the optical disc loaded in the optical disc device, based on the current address read by the address reading circuit.

With the above arrangement, the optical disc has the user data area and the physical information area having the formats different from each other. The first seeking circuit performs the seek operation to the predetermined reference address in the user data area, and the second seeking circuit performs the seek operation from the reference address sought by the first seeking circuit to the predetermined target address in the physical information area. The address reading circuit reads the current address at the position sought by the second seeking circuit, and the optical disc type determination circuit determines the type of the optical disc loaded in the optical disc device, based on the current address read by the address reading circuit.

Thus, it is possible to securely perform a seek operation to the physical information area, and to securely discriminate the type of the optical disc, even in a condition that it is difficult or impossible to accurately determine the type of the loaded optical disc.

The embodiments or the examples described in the detailed description of the invention are provided to clarify the technical contents of the invention. The invention should not be construed to be limited to the embodiments or the examples. The invention may be modified in various ways as far as such modifications do not depart from the spirit and the scope of the invention hereinafter defined.

Industrial Applicability

The optical disc discrimination method, the optical disc device and the integrated circuit of the invention are capable of accurately discriminating the type of an optical disc; and are useful as an optical disc discrimination method, an optical disc device and an integrated circuit for discriminating, from a plurality of types of optical discs whose recording densities are different from each other, the type of an optical disc loaded in the optical disc device for reading information recorded on the optical disc or recording information on the optical disc by irradiating a light beam onto the optical disc.

The invention claimed is:

1. An optical disc discrimination method for discriminating, from a plurality of types of optical discs having recording densities different from each other, the type of an optical disc loaded in an optical disc device for reading information recorded on the optical disc or for recording information on the optical disc by irradiating a light beam onto the optical disc, the optical disc having a user data area and a physical information area having formats different from each other, the optical disc discrimination method comprising:
 a first seeking step of performing a seek operation to a predetermined reference address in the user data area;
 a second seeking step of performing a seek operation from the reference address sought in the first seeking step to a predetermined target address in the physical information area;
 an address reading step of reading a current address at a position sought in the second seeking step; and
 an optical disc type determination step of determining the type of the optical disc loaded in the optical disc device, based on the current address read in the address reading step.

2. The optical disc discrimination method according to claim 1, further comprising:
 a third seeking step of performing a seek operation to the target address in the physical information area in accordance with the type of the optical disc determined in the optical disc type determination step.

3. The optical disc discrimination method according to claim 2, wherein
 the plurality of types of optical discs include a first optical disc and a second optical disc having recording densities different from each other,
 in the second seeking step, the seek operation from the reference address sought in the first seeking step is performed to the predetermined target address in the physical information area is performed, using a conversion coefficient corresponding to the first optical disc between an address and a radial position of the optical disc,
 in the optical disc type determination step, judgment is made as to whether the current address read in the address reading step is equal to or larger than a predetermined threshold value, the loaded optical disc is determined to be the first optical disc in the case where the current address is judged to be smaller than the predetermined threshold value, and the loaded optical disc is determined to be the second optical disc in the case where the current address is judged to be equal to or larger than the predetermined threshold value, and in the third seeking step, the seek operation is performed from the current address read in the address reading step to the predetermined target address in the physical information area, using a conversion coefficient corresponding to the second optical disc between an address and a radial position of the optical disc, in the case where the loaded optical disc is determined to be the second optical disc in the optical disc type determination step.

4. The optical disc discrimination method according to claim 1, further comprising:

a provisional discrimination step of provisionally discriminating the type of the optical disc before the seek operation to the reference address is performed in the first seeking step, wherein in the second seeking step, a value of the target address is switched, based on a provisional discrimination result on the type of the optical disc in the provisional discrimination step.

5. The optical disc discrimination method according to claim 4, wherein in the provisional discrimination step, the type of the optical disc is provisionally discriminated, based on at least one of the recording layer number derived from the number of focus error signals, the amplitude of a tracking error signal and the frequency of a wobbling groove.

6. The optical disc discrimination method according to claim 1, wherein the plurality of types of optical discs are reproduced using a light source configured such that a predetermined reproduction power is set for the each respective type of optical disc, and the optical disc discrimination method further comprises a reproduction power switching step of switching the reproduction power to a lowest reproduction power of the reproduction powers for the plurality of types of optical discs, before the seek operation to the target address is performed in the second seeking step.

7. The optical disc discrimination method according to claim 1, wherein the plurality of types of optical discs are reproduced using a light source configured such that a predetermined high-frequency component for the each respective type of optical disc is superimposed on a drive current, and the optical disc discrimination method further comprises a direct-current driving step of stopping superimposition of a high-frequency component and of driving the light source by a direct current, before the seek operation to the target address is performed in the second seeking step.

8. The optical disc discrimination method according to claim 1, wherein the optical disc of each respective type is driven and rotated at a predetermined linear velocity, and the optical disc discrimination method further comprises a rotation driving step of driving and rotating the optical disc at a highest linear velocity of the linear velocities for the plurality of types of optical discs, before the seek operation to the target address is performed in the second seeking step.

9. An optical disc device for reading information recorded on one of a plurality of types of optical discs having recording densities different from each other, or for recording information on the optical disc by irradiating a light beam onto the optical disc, the optical disc having a user data area and a physical information area having formats different from each other, the optical disc device comprising:

a first seeking section which performs a seek operation to a predetermined reference address in the user data area;

a second seeking section which performs a seek operation from the reference address sought by the first seeking section to a predetermined target address in the physical information area;

an address reading section which reads a current address at a position sought by the second seeking section; and an optical disc type determination section which determines the type of the optical disc loaded in the optical disc device, based on the current address read by the address reading section.

10. An integrated circuit for discriminating, from a plurality of types of optical discs having recording densities different from each other, the type of an optical disc loaded in an optical disc device for reading information from the optical disc or for recording information on the optical disc by irradiating a light beam onto the optical disc, the optical disc having a user data area and a physical information area having formats different from each other, the integrated circuit comprising:

a first seeking circuit which performs a seek operation to a predetermined reference address in the user data area;

a second seeking circuit which performs a seek operation from the reference address sought by the first seeking circuit to a predetermined target address in the physical information area;

an address reading circuit which reads a current address at a position sought by the second seeking circuit; and an optical disc type determination circuit which determines the type of the optical disc loaded in the optical disc device, based on the current address read by the address reading circuit.

* * * * *